United States Patent [19]

Koppen

[11] Patent Number: 4,459,807
[45] Date of Patent: Jul. 17, 1984

[54] CONTROL APPARATUS FOR FLUID OPERATED SYSTEMS

[75] Inventor: Kirk J. Koppen, The Hague, Netherlands

[73] Assignee: Koppen and Lethem AG, Cham, Switzerland

[21] Appl. No.: 346,327

[22] Filed: Feb. 5, 1982

[51] Int. Cl.³ .............................................. F16H 39/46
[52] U.S. Cl. .......................................... 60/452; 60/445
[58] Field of Search ................................ 60/445–452, 60/443, 444, 393; 417/218, 222

[56] References Cited

U.S. PATENT DOCUMENTS

| | | | |
|---|---|---|---|
| 3,635,021 | 1/1972 | McMillen et al. | 417/222 X |
| 3,935,707 | 2/1976 | Murphy et al. | 60/445 X |
| 3,987,622 | 10/1976 | Johnson | 60/445 X |
| 4,028,889 | 6/1977 | Budzich | 60/445 X |

*Primary Examiner*—Edward K. Look
*Attorney, Agent, or Firm*—Sughrue, Mion, Zinn, Macpeak and Seas

[57] ABSTRACT

A fluid pressure system has a reservoir and a variable delivery pump having an inlet connected to the reservoir and an outlet. A control valve connected to a control motor and feedback line with the feedback line adapted to control the fluid flow to and from the control motor to vary the pump displacement, to maintain the pressure at the pump outlet at a difference above the pressure in the feedback line. A control valve is adapted to control the fluid flow between the outlet, the load motor and the reservoir. The control valve is adapted to control the fluid flow between the load motor, the reservoir and a control line and is operable in a neutral position to block off the pump outlet from the load motor and to connect said control line to the reservoir. The control valve is operable to another position which connects said load motor to the control line before the pump outlet is connected to the load motor. A regulating valve is connected to and responsive to the control line and adapted to control fluid flow between the pump outlet and the control valve and to maintain the pressure to the control valve a difference above the pressure in the load motor. The regulating valve further is adapted to provide continuous fluid communication between the control valve and the feedback line to allow the control valve to operate the control motor to increase or decrease the output volume and pressure of the source of fluid pressure to a level above that in the load motor before the pump outlet is connected to the load motor and to allow the control valve to reduce the output volume and pressure of the source of fluid pressure when the control valve is in the neutral position.

10 Claims, 4 Drawing Figures

CONTROL APPARATUS FOR FLUID OPERATED SYSTEMS

BACKGROUND OF THE INVENTION

1. Field of Invention

The invention relates to fluid power systems, and more specifically, to those utilizing a variable displacement pump in which the output of the pump is regulated in response to the load demand.

2. Prior Art

It has been recognized that a variable displacement pump can be used with a control such that the output volume and pressure of the pump are constantly adjusted to demand. Systems are known in which a so-called "load-sensing" pump is provided with a control system such that it delivers as much fluid as is required to maintain a constant pressure difference between the pump and a hydraulic user (for example, a hydraulic cylinder or a hydraulic motor) across a metering orifice placed between pump and user.

A common type of such a pump is the axial piston type, whereby the stroke of the pump piston and hence the pump output is controlled by a control plate whose angle to the piston axis may be varied. The adjustment of this angle is made by a hydraulic cylinder or a similar device situated within the pump itself. Normally this cylinder is provided with a mechanical spring on one side of the piston and the other side of the piston is subjected to a hydraulic pressure led by a pilot line from the user line at a point between the user and the metering orifice.

Such a prior art hydraulic system is described, for example, in U.S. Pat. No. 3,444,689. As described therein, a directional control valve of the spool type represents, in one operated position a metering orifice between the pump duct and the user duct, and in the other operated position a metering orifice between the user duct and the return duct to the tank. In the neutral position, both orifices are blocked. A further passage is utilized in the directional control valve, connecting to the main bore between the pump and user ducts and leading to a servo valve for pilot operation of the pump adjustment cylinder. This passage is closed in the neutral position of the directional control valve, but in working position provides a connection to feed back load pressure to the aforesaid servo valve.

The servo valve comprises three piston members, of which the first is preloaded by a mechanical spring and subjected to the load pressure fed back from the directional control valve. This first piston transmits a force dependent upon load pressure and spring force to a second piston which in turn transmits by means of an intermediary spring the force to a third piston. This third piston is also influenced by hydraulic pressure that is tapped off the main pump duct. Under the influence on one side of the force derived from the first and second pistons and on the other side of the pump pressure, the third piston controls orifices between the pump duct and the duct to the pump control cylinder and between the pump control cylinder and a return duct to the tank.

There are a number of disadvantages of such a system as described in the prior art. First, the system does not provide an unloading of the pump in the neutral position of the directional control valve, when no useful work is being performed. This results because the load pressure fed back to the servo valve from the directional control valve is not decreased in a controlled manner and the load pressure remains. This implies that even in the neutral position of the directional control valve, the pump pressure is higher than the load pressure previously fed back. Stated differently, the pump delivers at higher pressure even in the non-working or neutral position of the directional control valve.

A second disadvantage of this prior art system is that the first two piston members of the servo valve are displaceable independently of one another and act upon one another by means of the mechanical spring. Through the absence of a fixed reference point this can lead to an instability which would impair the correct hydraulic function of the third piston which is essential for the function of the entire system. It is also evident that only one directional control valve can be connected to the servo valve and that the sytem does not permit the series or parallel control of several hydraulic users, let alone the simultaneous operation of more than one user. The system as described is therefore limited to the control of a single user, whereby speed in one direction can be controlled.

A third and especially great disadvantage is that the connection between directional control valve and servo valve which arranges the feedback of load pressure for pilot operation of the pump control must be a small dimension if it is not to divert excessive flow away from the user and adversely influence the control range. It follows necessarily that the reduced size of this connection results in a delay between a change in pressure in the user line and a corresponding correction of the pump control mechanism, usually placed remotely from the directional control valve. Should the distance be more than a few feet, the signal may be seriously attenuated or delayed.

SUMMARY OF THE INVENTION

It is an object of the present invention to resolve all the problems inherent in the prior art and to avoid all the accompanying disadvantages.

It is therefore an object of this invention to provide a novel and improved control for a variable displacement pump which is operable to regulate the pump output volume and pressure in response to load demand.

It is further an object of this invention to provide a novel and improved control permitting the simultaneous control of several hydraulic users, each foreseen with their particular directional control valve and all connected to one variable displacement pump of the load-sensing type in such a manner that the partial fluid flow to each user is independent of its load pressure and the load pressure of any other users and may be varied between zero and a maximum limit as an analogue function of a signal, preferably an electrical signal.

It is still a further object of this invention to provide a means of controlling the adjustment of the pump control whereby instead of the load pressure feedback, use is made of a piloting pressure derived indirectly from the load pressure and supplied from a source which is independent of the size of the passage in a directional control valve employed to feedback load pressure.

The foregoing as well as additional objects and features of the invention are shown in the accompanying drawings and described in the following detailed description of the preferred embodiment.

BRIEF DESCRIPTION OF THE DRAWING

It is understood that the same numerals identify the same elements shown first schematically in FIG. 2 and in cutaway section in FIGS. 2A-2B.

DESCRIPTION OF THE PREFERRED EMBODIMENT

Figure 1:
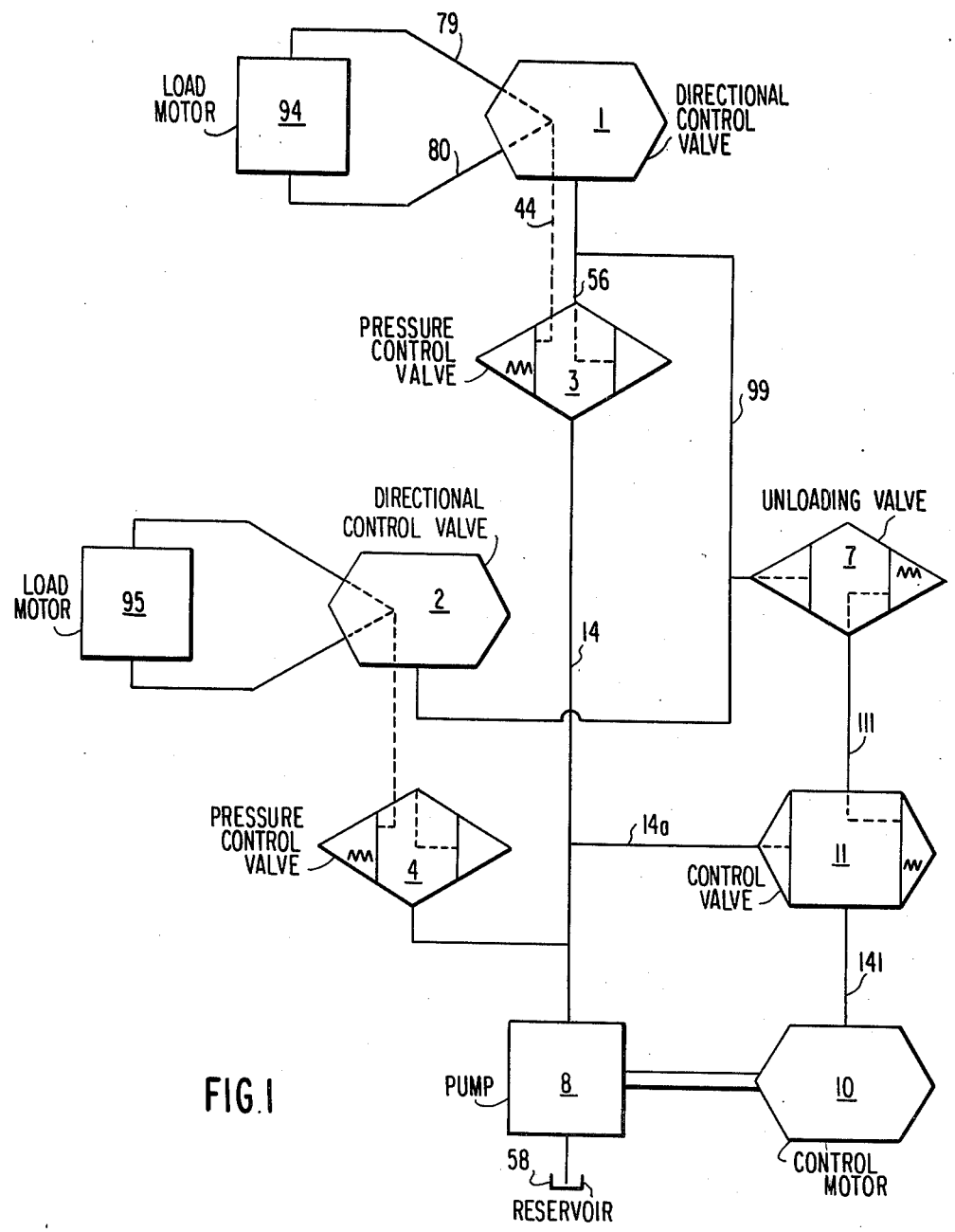
FIG. 1 is a schematic circuit diagram of a preferred embodiment of this invention as applied to the connection of several hydraulic users to a variable displacement pump of the load-sensing type.
Figure 2:
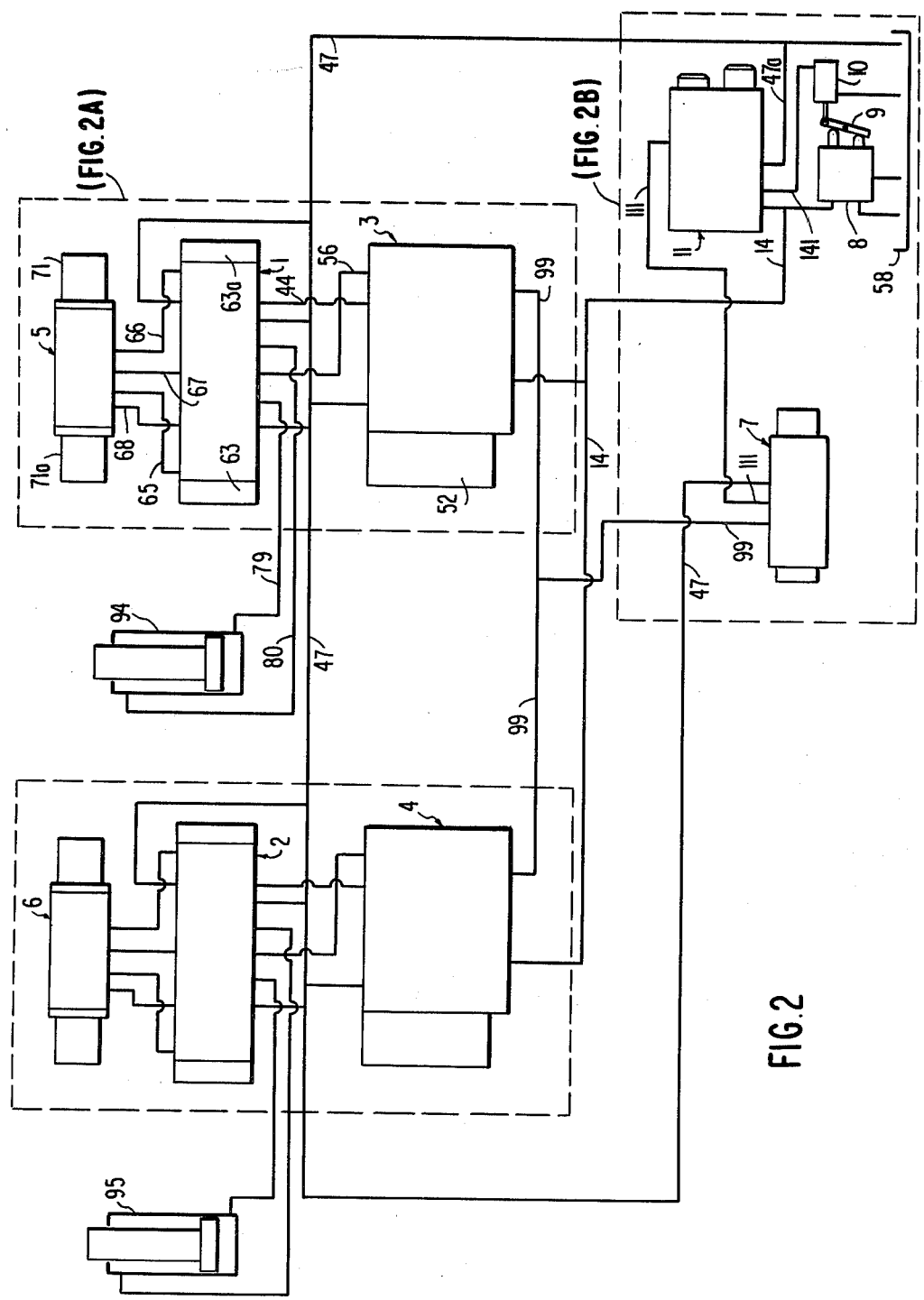
FIG. 2 is a schematic diagram of the preferred embodiment of the invention with cutaway sections illustrating the individual components in portions 2A-2B.

Referring now to FIGS. 1 and 2, the integrated control apparatus depicted in the schematic cross-sectional drawings comprises two identical main directional control valves of the spool type 1 and 2. Only control valve 1 is shown in cross-section. Although it is sufficient in order to explain the mode of operation of the invention to consider the use of only two directional control valves as above, it should be understood that the illustrated embodiment is not so limited. It is possible to connect three, four or more directional control valves.

Each directional control valve 1 or 2 influences a pressure control valve 3 or 4 allocated to that directional control valve. The directional control valves 1 and 2 are hydraulically pilot operated by means of the solenoid operated spool valves 5 and 6. The apparatus also includes an unloading valve 7. The pump 8 is shown as an axial piston pump wherein the stroke of the pump pistons and hence the pump output is controlled by a control plate 9 whose angle to the piston axis may be varied by movement of a hydraulic adjusting cylinder 10. The operation of hydraulic adjusting cylinder 10 is controlled by valve block 11, containing the flow and pressure controls 12 and 13.

The outlet of the pump 8 is connected by a line 14 to the pressure control valves 3 and 4. Since the construction and function of valves 3 and 4 are identical, it is sufficient to consider valve 3 since the same analysis is valid for valve 4. Also, while a variable displacement pump is shown, it is understood that a fixed pump and accumulator system could also be employed.

Figure 2A:
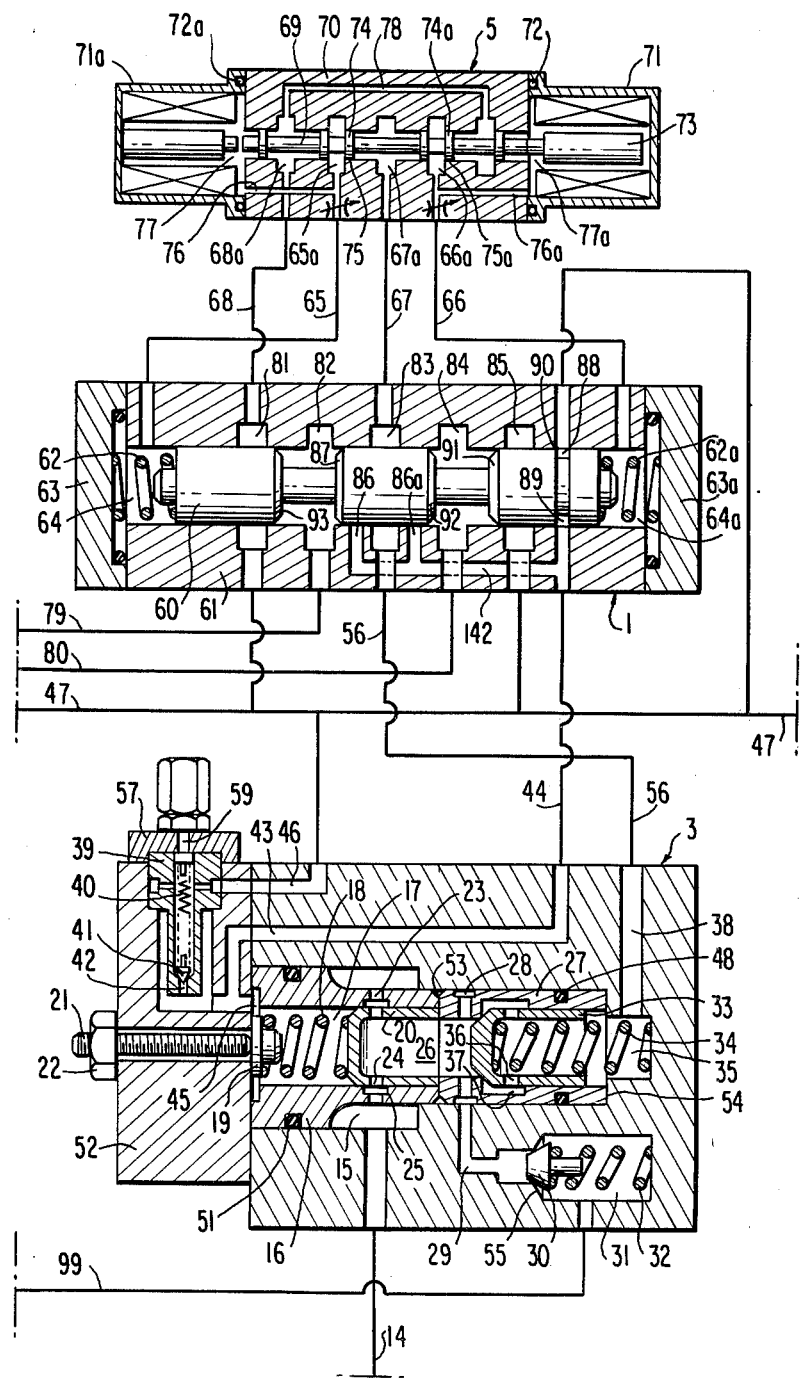
FIGS. 2A and 2B are detailed illustrations of the individual components in FIG. 2.

As shown in FIG. 2A, the pump output line 14 is in continuous communication with chamber 15 inside the pressure control valve 3. A sleeve member 16 located in chamber 15 has an outside diameter to provide a sliding fit therein. An appropriate sealing member 51 is employed to prevent leakage. Sleeve member 16 has a number of radial bores 23 communicating with the chamber 17 formed by a bore inside the sleeve member. The radial bores 23 have an enlarged diameter portion 25 where they emerge into chamber 17. Chamber 17 contains a spring member 18, abutting on one side against a spring plate 19 and on the other side against a control spool 20. The precompression of the spring member 18 can be adjusted by means of the control screw 21 fitted in a threaded hole in block 52, which in turn is securely retained by fastening means (not shown) to pressure control valve 3. The control screw 21 may be prevented from changing its adjustment by tightening lock nut 22.

In a similar manner to sleeve member 16, control spool 20, which is slidably movable within sleeve member 16, is provided with a number of radial holes 24 leading to the chamber 26 within the control spool. In the position of control spool 20 as illustrated in FIG. 2, communication is established between the pump output line 14 and chamber 26. This communication will be interrupted if control spool 20 moves to the left within sleeve member 16.

Positioned on the same axis as the first control sleeve member 16 is a second control sleeve member 27. It has a sliding fit in chamber 53 and is of appropriate length to abut against shoulder 54. It is dimensioned to reflect that block 52 is securely fastened to pressure control valve 3 and that control member 16 abuts against block 52. Sleeve member 27 is provided with a suitable sealing member 48.

The second control sleeve 27 is provided with a number of radial bores 28 to establish communication between chamber 26 and a channel 29 leading to a valve seat 55. As shown, the valve seat 55 is closed by a conically formed member 30 placed within a chamber 31 and pressed against valve seat 55 by a compressed spring member 32. The conically formed member 30 and valve seat 55 function as a non-return valve in a known manner.

Within the second control sleeve 27, chamber 35 is a valve poppet 33, slidably movable within sleeve 27, together with a bias spring member 34. The valve poppet 33 is provided with a number of radial bores 36 to provide continuous communication between chamber 35 and annulus chamber 37. For example, following a displacement of valve poppet 33 to the right, chamber 26 will be brought into communication via annulus chamber 37 and radial bores 36 with chamber 35. A channel 38 is continuously in communication with chamber 35 and leads via duct 56 to the directional control valve 1.

Block 52 is provided with a pressure relief valve 39, the principles of which will be apparent to those skilled in the art. It comprises a spring member 40 loading a conical valve poppet 41 against an entry bore 42 and with suitable adjustment means 57 not requiring further description. The entry bore 42 is in continuous communication with a load-feedback channel 43 and leads via duct 44 to the directional control valve 1. The load-feedback channel 43 is also in continuous communication via the counterbore 45 which chamber 17. Should a fluid pressure exist in load-feedback channel 43 which overcomes the force of spring member 40, entry bore 42 will be brought into communication with return channel 46 and hence to return duct 47 which is in continuous communication with the reservoir 58.

The precompression of spring member 40 can be varied by the adjusting screw 59 and this adjustment effectively limits the maximum pressure which can arise in duct 44 and thus in channel 43.

Directional control valve 1 is of the type fully described in U.S. Pat. No. 3,488,953 and therefore only the essential features will be further described here. The valve encompasses a slide member 60 which is axially moveable within a valve housing 61. The valve has a number of control channels, as will be considered later, and axial movement of the slide member 60 to the left or right of the center or neutral position illustrated will bring various of these channels into fluid communication. Centering spring members 62 and 62a abut against end covers 63 and 63a, which are suitably flanged to valve housing 61 by fastening means, not shown. Assuming that spring members 62 and 62a are chosen to provide equal precompression and that the pressure prevailing in piloting chambers 64 and 64a is initially equal, slide member 60 will be constrained to the center or neutral position, as illustrated.

Before describing the effects of an axial displacement of slide member 60, it is convenient to describe the construction of solenoid-operated spool valve 5. A slide member 69 is axially moveable within a valve housing 70 and two solenoids 71 and 71a are flanged to the housing 70 by suitable fastening members (not shown here) and suitable sealing means 72 and 72a. The solenoids 71 and 71a are identical, or nearly so, and are preferably constructed so that the force exerted by the solenoid armature is proportional to an electrical parameter, such as the electrical current passing through the coil winding.

If slide member 69 is displaced to the left, throttling land 74 of the spool will pass over throttling edge 75 and bring piloting channel 65a in fluid communication with pilot pressure supply channel 67a. It can readily be seen that channel 67a is directly connected to duct 67 and, in passing through valve 1, is also connected to duct 56. Piloting channel 65a is in continuous fluid communication with sensing channel 76 and thus with channel 77. Any pressure in chamber 77 will act over the cross-sectional area of slide member 69 and tend to displace it towards the right.

The postulated displacement of slide member 69 to the left will also result in throttling land 74a passing over throttling edge 75a, thus bringing chamber 64a, piloting channel 66a, duct 66, sensing channel 76a and chamber 77a, which are all in continuous communication, into operable fluid communication with communication channel 78, pilot pressure drain channel 68a and drain duct 68.

Referring again to the directional control valve 1, as mentioned herein, valve housing 61 has a number of control channels. Ducts 65 and 66 serve to conduct piloting pressures from valve 5 to the chambers 64 and 64a and facilitate positioning the valve spool or slide member 60 as will later be described. Ducts 79 and 80 are user ducts, shown here as forming fluid connections to a double-acting cylinder or linear motor 94. It is apparent that, for example, a rotary motor or indeed, another device such as a single-acting user can equally be controlled. These user ducts are connected by channels within valve 1 to chambers 82 and 84. Two further chambers 81 and 85 are in continuous fluid communication by channels in housing 61 to duct 47, which is in direct fluid communication with the fluid reservoir 58.

Chamber 83 is in continuous fluid communication with ducts 67 and 56 and as will be demonstrated, duct 56 serves as the inlet port of valve 1. Slide member 60 is provided with a groove to form chamber 88 which in the neutral position of the slide member communicates with return duct 47 and with duct 44 by means of bypass orifices 89 and 90. Ducts 44 and 47 are thus in fluid communication and axial displacement of slide member 60 in either direction will break this communication.

Now, if the system of FIGS. 1 and 2 is utilized, for instance through the user duct 79, then slide member 60 should be displaced to the right. During this axial displacement to the right, bypass orifices 89 and 90 are first closed, thus breaking the connection between ducts 44 and 47. Further axial displacement of slide member 60 uncovers sensing orifice 86 and brings chamber 82 in operable communication with communication channel 142 and thereby with duct 44. Still further axial displacement to the right of slide member 60 brings chamber 82 in operable communication with chamber 83 and duct 56.

As will be explained, duct 56 provides a supply of fluid at a pressure higher than the load pressure. It will, however, be recognized that fluid flow from duct 56 into pressure control valve 3 is effectively hindered by the non-return valve represented by valve poppet 33. Hence, even in unfavorable circumstances where load pressure exceeds the available pressure in duct 56, a load current move in an unintended direction.

It is preferred that slide member 60 is further provided with throttling lands 87, 91, 92 and 93, although this is not essential. The provision of throttling land 87 facilitates the establishment of a passage between chambers 82 and 83, (and hence between ducts 56 and 79) which can be simply varied by varying the axial displacement of the slide member 60. The axial displacement of slide member 60 to the right results in operable communication between chambers 84 and 85 and thus between ducts 80 and 47. Throttling 1 and 91 facilitates establishing a passage between ducts 80 and 47 which varies in the same or in a similar way to that between ducts 56 and 79.

If work was to be performed by the user through duct 80, this would requires an axial displacement of slide member 60 to the left. The axial displacement of slide member 60 to the left results in: (1) closing bypass orifices 89 and 90; (2) opening of sensing orifice 86a to bring chamber 84 in operable communication with channel 112; and (3) operable communication of chamber 83 with chamber 84 and of chamber 82 with chamber 81. Throttling lands 92 and 93 serve to vary the passages between the chambers.

From the preceding explanation it will be apparent that the pressure prevailing in duct 44 and specifically in channel 43 and chamber 45 is either the low return line pressure in duct 47 (when the valve 1 is in the neutral position and orifices 89 and 90 are connected) or the prevailing load pressure (when orifice 86 or 86a is uncovered).

Figure 2B:
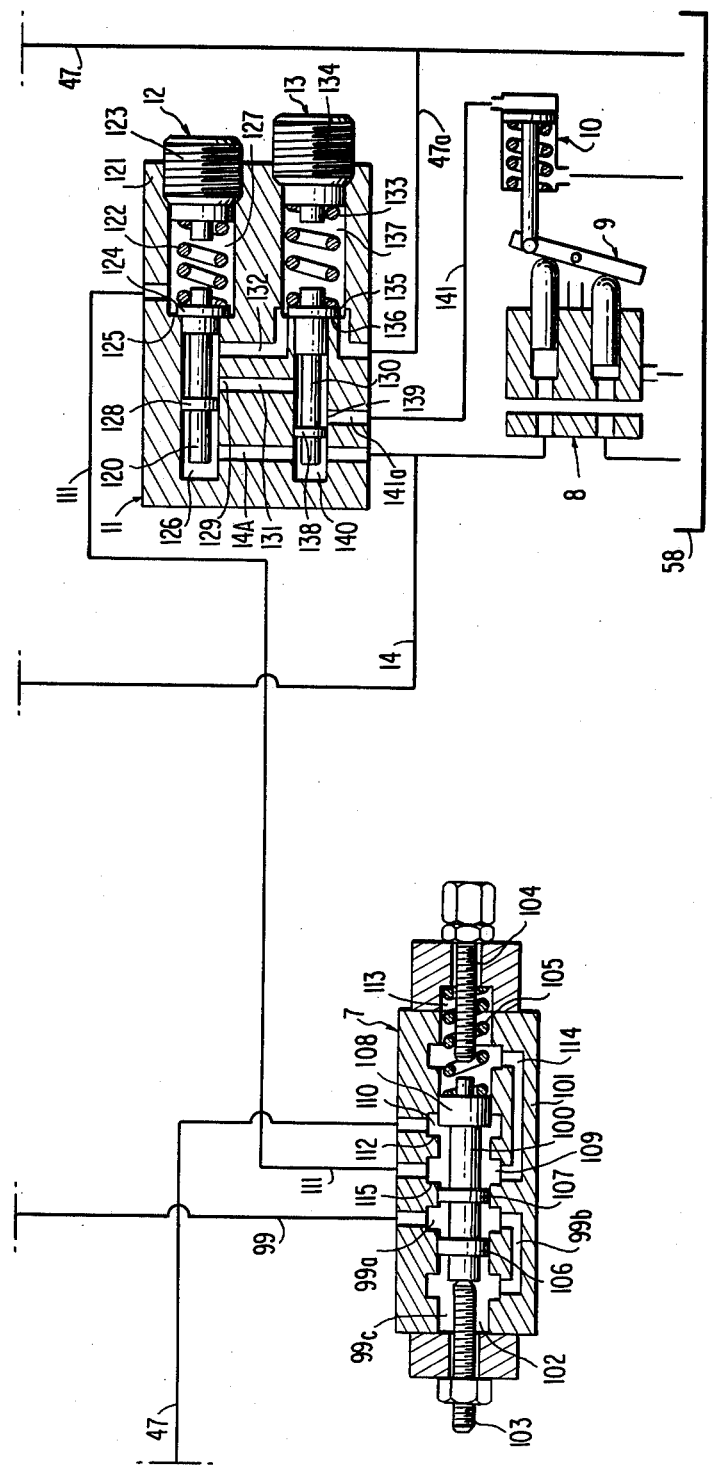

Unloading valve 7 detailed in FIG. 2B encompasses a slide member 100 axially movable within a valve housing 101 and is preferably fitted with adjustable stops 103 and 104 to limit slide member displacement. A further feature is a light spring member 105 in chamber 113 which serves to bias slide member 100 to the left. Chamber 113 is in continuous fluid communication with chamber 109 by means of passage 114. The slide member 100 is provided with control lands 106, 107 and 108. The pressure prevailing in connecting duct 99 is in continuous communication with chamber 99a, channel 99b and chamber 99c. Should the pressure in chamber 99c be insufficient to overcome the force of spring member 105, the slide member 100 remains biased to the left and control lands 107 and 108 provide an operable communication between sensing duct 111 and return duct 47, thus ensuring that sensing duct 111 is at negligible pressure. The setting of adjustable stop 103 will determine the position of slide member 100 and more especially the size of the passage formed by control land 108 and the throttling edge 112.

Should, however, the pressure in connection duct 99 and also in chamber 99c exceed a level determined by the characteristics of spring member 105, slide member 100 will move to the right. Since throttling land 107 is somewhat shorter than the groove in valve housing 101 forming regulating chamber 109, this displacement to the right will bring chambers 99a, 109 and drain chamber 110 into fluid communication with each other. Regulating chamber 109 is in continuous fluid communication with sensing duct 111 leading to the valve block 11.

The valve block 11 shown in FIG. 2B contains a flow control spool 120 and a pressure control spool 130 axially displaceable within valve housing 121. A spring member 122, abuts against shoulder 124 and holds the flow control spool 120 to the left such that shoulder 124 abuts against the abutment 125. The force constraining flow control spool 120 to the left may be varied by an adjusting mechanism 123, and the forces acting to displace the flow control spool 120 to the left will be the thrust of spring member 122 and the force created by any pressure in chamber 127, which is in continuous fluid communication with sensing duct 111.

Chamber 126 is in continuous fluid communication with pump channel 14a and thus with the pump output line 14 and the pump pressure will thus create a force tending to displace flow control spool 120 to the right and acting against the aforesaid forces tending to displace it to the left. A displacement of flow control spool 120 to the right will result in throttling land 128 uncovering throttling orifice 129 and bring pump channel 14a into operable fluid communication with channel 131. The axial bore within which flow control spool 120 may be slidably displaced includes channel 132 such that until throttling land 128 covers throttling orifice 129, channels 131 and 132 are in fluid communication. Channel 132 is in continuous fluid communication with chamber 137, which is itself in continuous fluid communication with channel 47a and thus with return channel 47.

The pressure control spool 130 is constrained to the left by spring member 133 and is suitably preloaded by adjusting mechanism 134, until shoulder 135 strikes abutment 136. The spool is provided with a 1 and 138 and chamber 140 thus formed is in continuous fluid communication with pump output line 14. Channel 131 is in fluid communication with channel 141a and, via duct 141 with the hydraulic adjustment cylinder 10. Only when the pump pressure in chamber 140 exceeds a value corresponding to the force exerted by spring member 133 will land 138 move to the right to pass over orifice 139 and connect channel 141a to channel 14a.

The control device described herein operates as follows:

Pressure medium, preferably hydraulic oil, supplied by pump 8, passes through the pump outlet line 14 to chamber 15 of pressure control valve 3 (and to the corresponding chamber of valve 4) and through diameter 25 and orifice 24 to chamber 26. In the neutral position of slide members 60 and 69, no flow path is presented by duct 56 and valve poppet 33 remains closed while a pressure builds up in chamber 26, tending to displace control spool 20 to the left. Opposing this tendency is the force of spring member 18 and any pressure present in chamber 17. In the neutral position of slide member 60, chamber 17 is in fluid communication via counterbore 45, channel 43, duct 44 and chamber 88 with the return duct 47 and is thus at substantially zero pressure. In this condition, the pressure in chamber 26 will rise to a level sufficient to overcome spring member 18, whereupon control spool 20 will move to the left and close off fluid communication between chambers 26 and 15. Any decrease in the pressure in chamber 26, however it may occur, will cause spool 20 to return to the right and open again radial holes 24 to re-establish fluid communication between chambers 15 and 26 until the spool 20 is again in equilibrium, whereby the pressure in chamber 26 corresponds to the force of spring member 18 as determined by the adjustment bolt 21 and nut 22.

The pressure in chamber 26 is sufficient to overcome the light spring 32 and permits pressure (at a slightly reduced level) to pass to connection duct 99. Since duct 99 is in continuous fluid communication with chamber 102, this pressure will be present in chamber 102 and will urge slide member 100 to the right.

This tendency is opposed by spring member 105 and by any pressure present in chamber 113. Originally, chamber 113 is vented by passage 114, chamber 109 and drain chamber 110 to return duct 47 at negligible pressure. However, as soon as slide member 100 moves to the right under the influence of pressure in chamber 102 overcoming spring member 105, land 107 passes over control edge 115 and sliding member 100 will come into equilibrium when the pressure in chamber 102 is equal to the force of spring member 105 aided by a pressure generated in chamber 113. Land 107 adopts a position such that chambers 99a, 109 and 110 are mutually interconnected but present different resistances to oil flow, modulating its position until the pressure in chambers 113 (and hence also chamber 109) is equal to the pressure present in chamber 102 reduced by a fixed bias corresponding to the adjustment of spring member 105. This pressure is led by sensing duct 111 to the valve block 11.

The pressure in duct 111 is in continuous fluid communication with chamber 127 and assists spring member 122 in maintaining slide member 120 fully to the left. The movement of control spool 20 to the left, as earlier described, effectively blocked flow of pressure medium from chamber 15 and pump outlet line 14, and the pump pressure showed a tendency to increase. This pump pressure is present in channel 14a and also in chamber 126, tending to move slide member 120 to the right. Should the pressure in chamber 126 exceed the force of spring member 122 and the pressure present in chamber 127, slide member 120 will move to the right and permit land 128 to pass over throttling orifice 129. This in turn allows the pressure medium to pass from chamber 126 into channels 131 and 141a to duct 141 and hence to the hydraulic adjustment cylinder 10. The end result is movement of control plate 9 to reduce the stroke of the pump 8.

The system in accordance with this invention involves several modulating elements, and the conditions prevailing in the neutral position can better be visualized by a numerical example. If spring member 18 represents a bias of 6 bars, the pressure in chamber 26 will be 6 bars. Assuming that spring member 32 represents a bias of 1 bar, the pressure in chambers 31 and 102 will be 5 bars. Further assuming that spring member 105 represents a bias of 2 bars, the pressure in chambers 115 and 127 will be 3 bars. Finally, assuming that spring member 122 represents a bias of 9 bars, slide member 120 will modulate to admit or release pressure medium from the pump control mechanism to maintain a pump pressure of 12 bars. It is emphasized that the values quoted are numerical examples only and are in no way fixed embodiments of the invention. On the contrary, the various adjustments provide considerable flexibility of choice to adapt to a given application.

Operation of the user mechanism, here represented by a double-acting cylinder 94, first requires that the pressure medium be introduced into duct 79 or 80 as appropriate to the direction required. To take the example of outstroking, it will be necessary for pressure medium to flow from duct 79 into cylinder 94.

The application of an electrical signal, in the form of an electrical current, to solenoid 71 will create a certain armature force tending to displace slide member 69 to the left and permitting control land 74 to pass over control edge 75, thus bringing chamber 65a into fluid communication with chamber 67a. Chamber 67a is in continuous fluid communication (via duct 67, chamber 83, duct 56 and channel 38) with chamber 35 and pressure medium present in chamber 26 can easily overcome the light spring member 34 to move valve poppet 33 to the right, thus bringing chamber 26 into fluid communication with chamber 35 by means of chamber 37 and radial bores 36. The pressure in chamber 26 is thus also present in chamber 67a, reduced by an amount corresponding to the bias of the light spring member 34.

Because the energization of solenoid 71 moves slide member 69 to the left and brought chambers 67a and 65a into fluid communication, pressure medium can now flow into piloting duct 65 and thus into piloting chamber 64. This oil flow encounters a resistance in that it assists spring member 62 to displace slide member 60 to the right and compress spring member 62a. The increased pressure caused by this resistance is present not only in chamber 64 and duct 65, but also passes by sensing channel 76 to the chamber 77 in the solenoid 71a. This pressure in chamber 77 opposes the force of the armature of solenoid 71, and slide member 69 will be in equilibrium when the pressure in chamber 77 acting over the cross-sectional area of slide member 69 is equal to the armature thrust. Stated differently, a given current applied to solenoid 71 will result in a given piloting pressure being present in chambers 77 and 64.

It will be seen that at the same time as the pressure medium was permitted to pass from chamber 67a to 65a, control land 74a passed over control edge 75a and permitted the pressure medium to escape from chamber 64a via duct 66. If we assume the application of an increasing current to solenoid 71, the pressure in chamber 64 will first rise to a low value and produce a small displacement of slide member 60. This initial displacement will move chamber 88 to the right and interrupt the fluid communication between bypass orifices 89 and 90. At approximately the same displacement, control land 87 will uncover sensing orifice 86 and bring communication channel 142 and hence feedback duct 44, into fluid communication with chamber 82 and furthermore with the load pressure prevailing in duct 79. Duct 44 was previously vented to return line 47, but it is now in fluid communication with the load pressure. This load pressure signal in duct 44 is also present, as previously described, in chamber 17 and will displace control spool 20 to the right to re-open fluid communication between chambers 15 and 26. As the pressure in chamber 15 is equal to the pump pressure and higher than that previously present in chamber 26, the pressure in chamber 26 will rise, as will the pressure in chamber 31, duct 99 and chamber 102.

It will be seen herein that this pressure in connection duct 99 is responsible for establishing the desired pump pressure. It is an important feature of the invention that this signal is derived not from the load itself (for example, from duct 44 after passing through a number of small orifices with the consequent risk of attenuation) but rather from chamber 26 with the full delivery of the pump available to provide a strong signal capable of being transmitted over a much longer distance.

By the modulating process previously described, slide member 100 will adopt a new position to create a new pressure in chambers 109 and 127 and slide member 120 will be displaced to permit pressure medium to enter or leave hydraulic adjustment cylinder 10 in order to adapt the pump stroke. The pressure in chamber 126 (pump pressure) corresponds to the bias of spring member 122 plus the pressure in chamber 127.

Again, a numerical example will serve to clarify the function. If the pressure occasioned by the load is 100 bars, this pressure will be present in duct 79, chamber 82, sense orifice 86, channel 112, duct 44, channel 43, counterbore 45 and chamber 17. Assuming the same numerical value as before for spring members 18 (6 bars), 32 (1 bar), 105 (2 bars), and 122 (9 bars), the pressure in chamber 26 will be 106 bars; in chamber 31, duct 99 and chamber 102, it will be 105 bars; in chamber 115, duct 111 and chamber 127, it will be 103 bars; in chamber 126 (pump pressure), it will be 112 bars and this pressure is also present in chamber 15. Control spool 20 will open to compensate for any leakage to maintain a pressure of 106 bars in chamber 26. It will be seen that the pressure in chamber 26 is maintained at a pressure greater than the load pressure, the difference being established by the bias of spring member 18.

A further increase in the current applied to solenoid 71 will result in a further increase in the displacement of slid member 60 to the right, sufficient to bring chambers 83 and 82 into fluid communication. Pressure medium may thus flow from chamber 26 past valve poppet 33, chamber 37, radial bores 36, chamber 35 and channel 38 to duct 56 and chamber 83. The flow volume from chamber 83 to chamber 82 and the user is determined by both the pressure difference across the throttling orifice formed between chambers 83 and 82 and by the size of this orifice. It will be evident from the foregoing description that a constant pressure difference is being maintained between chambers 83 and 82, this being represented by the bias of spring member 18 less the bias of light spring member 34. The flow volume to the user is independent of the load, and is proportional to the size of the throttling orifice. Since this is determined by the displacement of slide member 60 and because this displacement is itself proportional to an electrical signal, the end effect is that user speed can be controlled by means of an electrical signal.

The foregoing system postulated a slowly increasing signal and described a series of events in a sequential manner, but it will be appreciated that by using a nearly incompressible pressure medium, the events described occur almost instantaneously, each modulating component rapidly adapting itself to new signals. If the slide member 60 is returned to its neutral position, sense orifice 86 is closed, bypass orifices 89 and 90 are again brought into fluid communication, chamber 17 is once again vented and conditions return to those mentioned at the beginning of this description of the function.

The system is provided with two forms of overload protection. The pressure relief valve 39 ensures that the pressure in entry bore 42 and thus in chamber 17 cannot exceed a value corresponding to its setting. This results in the pressure in chamber 26 and every part of the system supplied therefrom, not exceeding a certain value. This may be regarded as a secondary protection. Pressure control valve 13 forms a primary pump protection. Pump pressure is present in chamber 140 and sliding member 130 will move to the right should the pump pressure exceed a value corresponding to the compression of the strong spring member 133. Control land 138 will pass over channel 141a and pressure medium from the pump will pass through duct 141 to hydraulic adjustment cylinder 10 to reduce pump stroke until the pump pressure falls below the setting made by adjustment means 134.

It will be useful for the complete understanding of the invention to summarize the various pressures in the system in the form of equations where, P followed by an index represents the pressure in any particular chamber or duct, B followed by an index represents the bias created by any spring member and L represents the load pressure.

In the neutral position, $$P_{14} = B_{18} - B_{32} - B_{105} + B_{122}$$

$$P_{26} = B_{18}$$

In the operated position, $$P_{14} = L + B_{18} - B_{105} + B_{122}$$

$$P_{26} = L + B_{18}$$

$$P_{82} = L$$

$$P_{83} = P_{26} - B_{34}$$

$$P_{83} = P_{82} = (P_{26} - B_{34}) - (L)$$

$$= L + B_{18} - B_{34} - L$$

$$= B_{18} - B_{34}$$

It can be seen that in neutral, the pump pressure ($P_{14}$) is relatively low and is determined by the sum and difference of certain spring forces. The pump is "unloaded". When operated, the pressure difference across the throttling orifice of the directional valve ($P_{83} - P_{82}$) is constant and corresponds to the difference between two spring forces. When operated, the pump pressure $P_{14}$ is matched to the load—it is the load pressure plus the "unloading" pressure.

Turning now to the simultaneous operation of two (or more) users, it will be readily seen that the pressure level prevailing in connection duct 99 will correspond to the higher of the two loads, assuming thathe valves 1 and 2 as well as 3 and 4 and also 5 and 6 are identical. Should the load pressure of user 95 be higher than that of user 94, the pressure at channel 29a will be greater than that in channel 29 and it will be user 95 which determines the level of pump pressure. In pressure control valve 3, the primary pump pressure from duct 14 will be reduced in chamber 26 to a level corresponding to the load of user 94 and in pressure control valve 4, the same primary pump pressure will be reduced to a different (higher) pressure corresponding to the load of user 95.

The rapidity with which the pump responds to changes in load, including returning to the "unloaded" position is determined by the setting of adjustable stops 103 and 104, which limit the dead band and maximum opening of slide member 100, enabling the response characteristics of the system to be adapted to the particular application. Although it has been assumed until now that the settings of the various spring members has been identical for each user, it is apparent that suitable manipulation of these settings provides yet another means of adaptation to the needs of any particular application.

Other modifications of this invention can be achieved without departing from the essential aspects of this invention.

I claim:

1. A fluid pressure system comprising;
   a reservoir (58);
   a variable delivery pump (8) having a control member (9) movable to vary the pump output displacement and having an inlet connected to said reservoir (58) and an outlet (14);
   a fluid pressure operated control motor (10);
   a fluid load motor (94);
   a feedback line (111);
   a control valve (11) connected to said control motor (10), said pump outlet (14), said reservoir (58) and feedback line (111), said control valve being adapted to control the fluid flow to and from said control motor (10) to vary the pump displacement, to maintain the pressure at said pump outlet (14) a difference above the pressure in said feedback line (111);
   a control valve means (1) adapted to control the fluid flow between said pump outlet (14), said load motor (94) and said reservoir (58), said control valve means further adapted to control the fluid flow between said load motor (94), said reservoir (58) and a control line (44), said control valve means (1) being operable in a neutral position to block off said pump outlet (14) from said load motor (94) and to connect said control line (44) to said reservoir (58), said control valve means (1) being operable to another position which connects said load motor (94) to said control line (44) before said pump outlet (14) is connected to said load motor (94);
   a regulating valve (3) connected to and responsive to said control line (44) and adapted to control fluid flow between said pump outlet (14) and said control valve means (1) and to maintain the pressure to the control valve means (1) a difference above the pressure in the load motor (94) and said regulating valve further adapted to provide continuous fluid communication between said control valve means (1) and said feedback line (111) to allow said control valve (11) to operate said control motor (10) to increase (or decrease) the output volume and pressure of said variable delivery pump (8) to a level above that in said load motor (94) before said pump outlet (14) is connected to said load motor (94), and to allow said control valve (11) to reduce the output volume and pressure of said variable delivery (8) when said control valve means (1) is in the neutral position.

2. The system of claim 1 further comprising regulating valve means (7) responsive to the pressure of said control valve means (1) and adapted to control fluid flow between said control valve means (1), said reservoir (58) and said feedback line (111).

3. The system of claims 1 or 2 further comprising adjustment means to limit the maximum pressure in said control line.

4. The system of claims 1 or 2 wherein said regulating valve comprises a housing having a chamber (15) in communication with said pump outlet (14), a sleeve member (16) disposed in said chamber having a series of radial bores (23) communicating with an internal chamber means defining a seal (51) between said sleeve member and said housing, a second control sleeve (27) disposed in said housing and, means to seal (48) said second control sleeve in said housing.

5. The system of claim 2 wherein said regulating valve means further comprises a slide member axially movable within a housing and adjustable stop means at ends of said housing to determine the limits of travel of said slide member.

6. The system of claim 4 further comprising a valve poppet (33) disposed in said second control sleeve, said valve poppet movable in response to the load pressure from said load motor and the load pressure from said pump outlet.

7. The system of claim 6 further comprising means (34) to bias said valve poppet into a closed position.

8. The system of claim 6 further comprising a non-return valve (30) interposed between said regulating valve and said regulating valve means.

9. The system of claim 8 further comprising means to bias said non-return valve into a closed position.

10. The system of claims 1 or 2 wherein said control valve, said control valve means, said regulating valve and said regulating valve means are formed as a single unitary block.

* * * * *